Feb. 9, 1937.    R. CLADE    2,069,998
LUBRICATED VALVE
Filed May 6, 1936    3 Sheets-Sheet 1
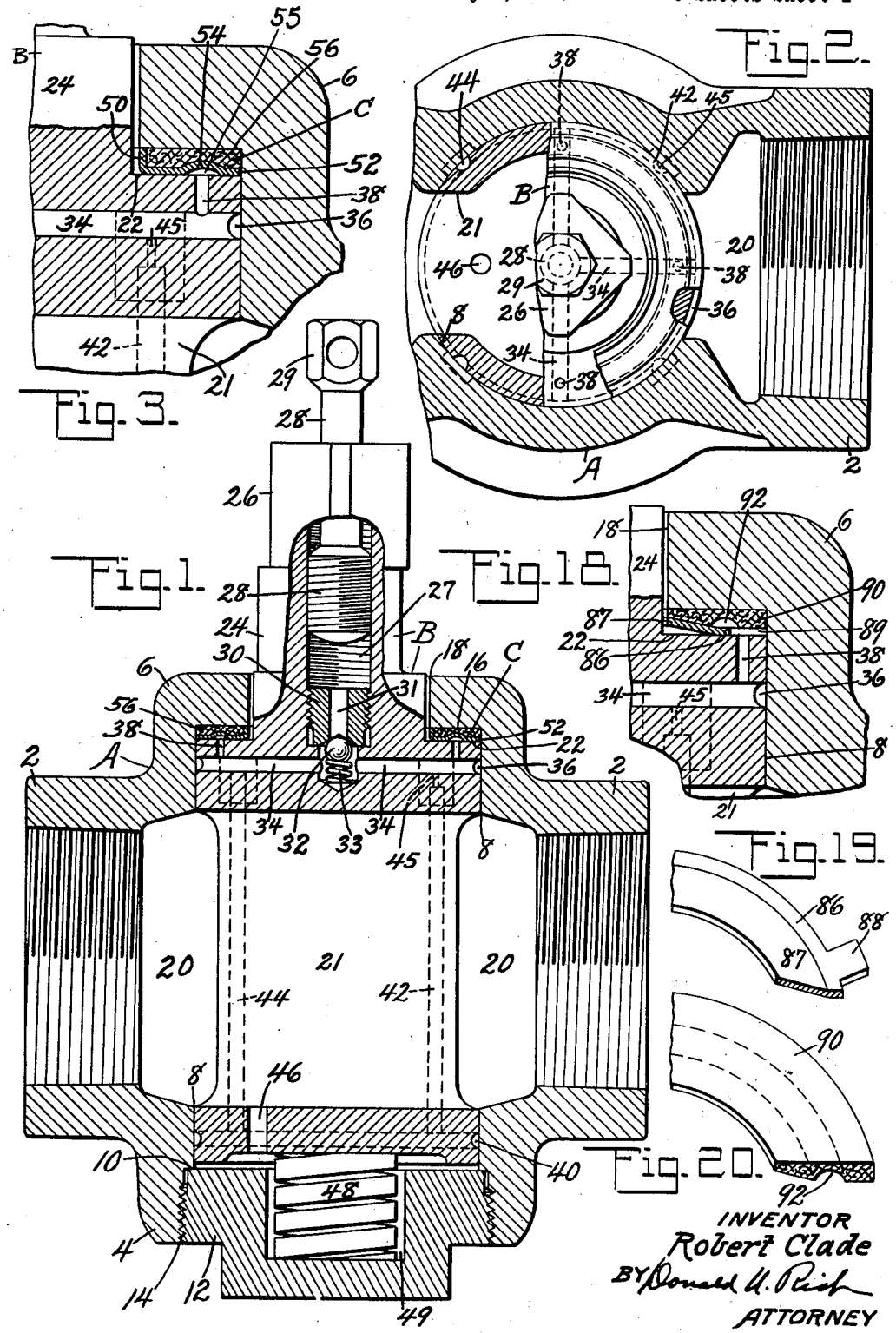

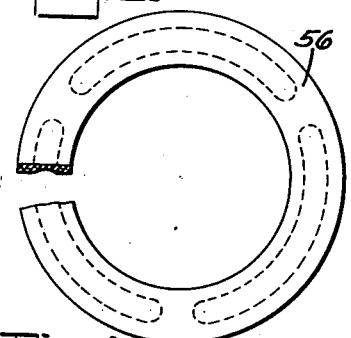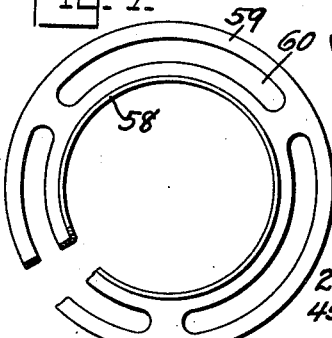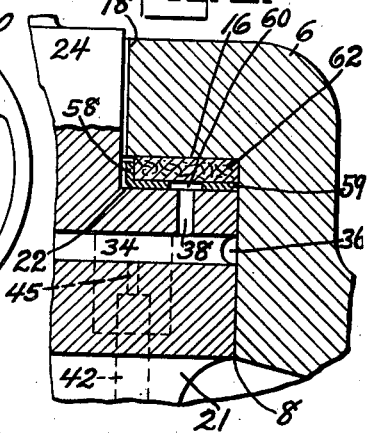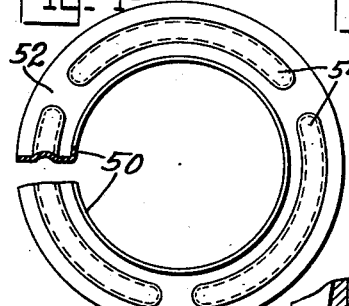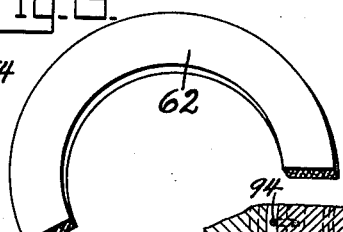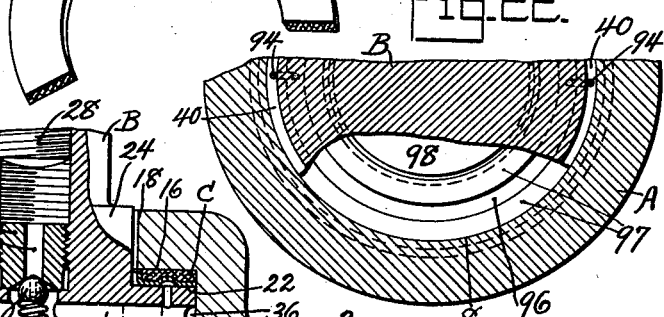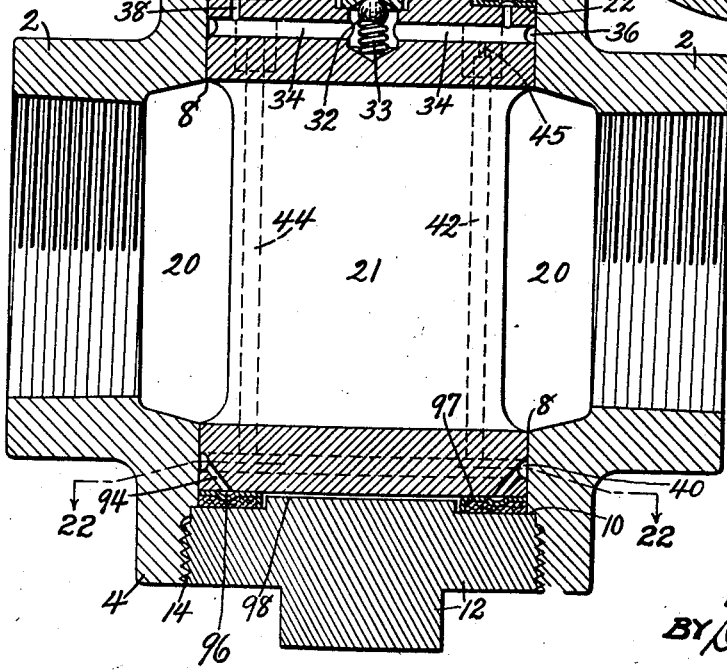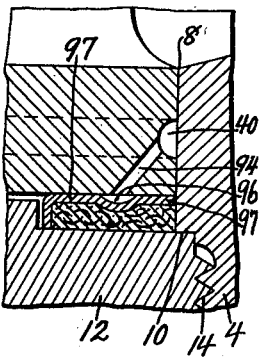

Feb. 9, 1937.  R. CLADE  2,069,998

LUBRICATED VALVE

Filed May 6, 1936  3 Sheets-Sheet 3

INVENTOR
Robert Clade
BY Donald U. Rich
ATTORNEY

Patented Feb. 9, 1937

2,069,998

UNITED STATES PATENT OFFICE 2,069,998

LUBRICATED VALVE

Robert Clade, Detroit, Mich., assignor to American Car and Foundry Company, New York, N. Y., a corporation of New Jersey Application May 6, 1936, Serial No. 78,132

3 Claims. (Cl. 251—93)

This invention relates to improvements in valves and particularly to plug valves in which a semi-solid is forced under pressure between the contacting surfaces of the plug and body to lubricate and seal the same.

Valves of this general type have been previously constructed but have required exceedingly accurate and expensive machine work in order that the valve would operate properly and not leak under adverse conditions. In the valves as previously constructed an accurately machined shoulder or surface on the plug or rotatable member had direct bearing upon the accurately machined surface of the valve body and these surfaces had to be absolutely plane and parallel to prevent leaks, but even though the valve was properly made leaks were liable to develop due to warpage of one of the elements when subjected to sudden temperature and pressure changes. The bearing surfaces were generally lubricated and sealed by means of an annular groove interrupting the surfaces and cut in either the plug or valve casing at a considerable expense.

Valves of the direct bearing type mentioned above had to be finished with extremely small clearances which, of course, changed due to wear and the valves developed leaks necessitating the full replacement of the entire valve. One object, therefore, of this invention is the provision of means which may be readily replaced by similar but thicker means to compensate for wear.

Another object of the invention is the provision of a lubricated valve wherein there is no direct bearing between the plug or rotatable member and the valve body at the head portion.

Yet another object of the invention is the provision of a lubricated valve wherein a member is interposed between spaced surfaces on the plug or rotatable member and the valve body and wherein the member is provided with lubricant grooves stamped or otherwise formed therein.

A further object of the invention is the provision of a lubricated valve having bearing surfaces separated by slightly resilient means.

A still further object of the invention is the provision of a lubricated valve having means adapted to compensate for slight inequalities in the machining of the plug and valve body.

These and other objects of the invention will be apparent to those skilled in the art after a study of the following description and accompanying drawings, in which:

Figure 1 is a sectional view of the improved valve, the valve being shown in the open position;

Fig. 2 is a staggered sectional view through the upper portion of the valve shown in Fig. 1;

Fig. 3 is an enlarged sectional view showing the spacing means of Fig. 1;

Fig. 4 is a plan view of the metallic spacing means of Fig. 1;

Fig. 5 is a plan view of the resilient spacing means of Fig. 1;

Fig. 6 is an enlarged sectional view similar to that shown by Fig. 3 but discloses a modification thereof;

Figs. 7 and 8 are plan views of the spacing means of Fig. 6;

Fig. 18 is an enlarged sectional view showing another or fifth modification of the valve shown in Figs. 1 to 5 inclusive;

Figs. 19 and 20 are partial plan views of the spacing means used in the valve of Fig. 18;

Fig. 21 is a sectional view similar to that shown in Fig. 1 but showing a modification of the plug supporting means;

Fig. 22 is a sectional view taken on line 22—22 of Fig. 21, and

Fig. 23 is an enlarged sectional view showing details of the lower plug supporting means.

Figure 10:
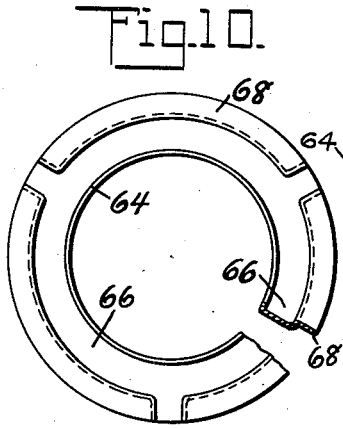
Figs. 10 and 11 are plan views of the spacing means shown in Fig. 9.

Referring now to the several drawings in detail wherein like parts will be indicated by means of like numerals, it is seen that the valve casing or valve body A receives a valve plug or rotatable member B which serves to intercept the flow of matter through the valve and that these two parts are separated at the head portion of the valve by means of a sealing means C.

The valve body or valve casing is of somewhat usual form having pipe connecting portions 2, open base portion 4, partially closed top or head portion 6, and plug receiving cylindrical bore 8. In the instance shown the accurately machined plug receiving cylindrical bore is slightly enlarged at the base portion to provide a machined ledge 10 against which the removable cap 12 may be forced by the threads 14. The upper end of the cylindrical bore is terminated in the head portion by plane surface 16 surrounding the stem opening 18. The cylindrical bore has communication with the pipe connecting portions through customary ports 20.

The valve plug or rotatable member B is substantially cylindrical in form and closely fits within the casing bore and is formed with opening 21 which in one position of the plug will connect the ports for the flow of matter therethrough. The upper portion of the plug or rotatable member is formed with a plane shoulder 22 surrounding the stem 24 extending upwardly to the wrench receiving portion 26. The stem has a threaded passageway therethrough constituting a lubricant reservoir 27 receiving a screw or ram 28 having an operating head 29 and to also receive a member 30 having a passage 31 which may be sealed by a ball 32 held in place by spring 33, thus forming a one-way or check valve at the lower part of the passageway. A transverse duct 34 connects the lower end of the pasageway directly with an upper spreader or sealing groove 36 which completely surrounds the upper portion of the plug, while vertically-disposed feeder ducts 38 extend from the transverse duct to the plane shoulder of the plug. The bottom sealing groove 40 is connected to the upper groove by vertical grooves 42 and 44 cut in the plug on either side of the plug opening, and the vertical groove 42 is provided with a restricted portion 45, all as clearly disclosed in the drawings. It is also to be noted that while the grooves 42 and 44 are shown as extending to and being connected with the lower sealing or arresting groove 40 it is to be understood that within the spirit and scope of the invention one or more of the grooves 42 or 44 may be connected with the groove 40, and the remaining grooves have their lower ends terminating short of said groove 40 whereby to be disconnected therefrom.

Formed in the lower portion of the plug of the valve shown in Fig. 1 is an opening 46. This opening is provided for the purpose of preventing the building up of excess pressures within the plug should an operator lubricate the value when the plug is in closed position. It is well known that when the plug is in closed position and line pressure acting thereagainst, the plug will shift radially in the body into close sealing engagement with the outlet port, thus permitting lubricant under pressure to be forced into the interior of the plug. Without the provision of means for relieving pressure, lubricant forced into the interior of the plug would build up a pressure therewithin which might result in bursting of the plug. With the provision of the opening 46 the building up of bursting pressure within the plug is prevented because any lubricant forced within the plug when the latter is in closed position will be vented through the opening 46. The plug is retained in its normal position by means of a spring 48 acting against the base of the plug. This spring 48 is preloaded and is arranged in a spring seat or pocket 49 formed in the base plate or cap 12. As can be seen, the spring constantly urges the plug longitudinally in the body and when in its normal position the upper end portion of the plug closely engages the sealing means C, as shown clearly in Figs. 1 and 3. The sealing means of these figures comprises a metal annulus having an inner positioning and retaining flange 50 and a body portion 52 which rests on the upper end or shoulder of the plug and which has pressed or otherwise formed therein, a plurality of raised portions 54 which provide discontinuous grooves 55 which open downwardly or, in a direction opposite to that in which the flange is directed. This is clearly shown in Fig. 4. The sealing means C of Figs. 1, 3 and 4 also includes an annulus 56 of slightly resilient material such as fiber or the like which is formed with recessed portions adapted to fit over the raised portions of the metallic annulus, see Figs. 1 and 3. It will be apparent from an inspection of the drawings that the sealing means formed of the metallic and non-metallic annuli will fit between the shoulder of the plug and the surface 16 of the head portion and constitute a means for preventing leakage of line pressure and the lubricant from the valve body.

To lubricate the valve, lubricant is placed in the reservoir 27 and is forced by the ram past the check valve 32 and through the transverse passage 34 to the feeder ducts 38. The lubricant will also pass to the upper sealing or arresting groove 36 and also through the longitudinal grooves 42 and 44 to the lower arresting or sealing groove 40. It will be apparent that the recesses formed in the metallic annulus cooperate with the upper end or shoulder of the plug in providing discontinuous lubricant grooves 55. Operation of the plug from closed to open position will, of course, spread the lubricant over the contacting surfaces of the plug and body and also over the shoulder of the plug to effectively seal the valve against head leaks. When the valve is fully lubricated, should additional lubricant be forced from the reservoir 27 to the lubricating system of the valve, a pressure will be built up in the lubricant groove 55 which will be in excess of the action of the spring 48 and any line pressure which may be acting against the lower end of the plug and the plug will then shift axially in the body against the action of the spring and line pressure and thus cause separation of the sealing means C and the plug shoulder and permit excess lubricant to be vented from the body through the space between the stem and the head portion.

It is thus seen that a fully lubricated valve is provided wherein the plug may shift axially to prevent over-lubrication and that slightly resilient sealing means are provided which will accommodate itself to any slight irregularities in the head portion of the valve and also that renewable sealing means are provided which may be easily replaced to compensate for wear or to adjust clearances.

In the modification shown in Figs. 6, 7 and 8 the valve body and plug are the same as that previously described but the sealing means is slightly modified. The metallic annulus is provided with a positioning and retaining flange 58 and a flat body or main portion 59 in which arcuate slots 60 are formed, thus providing discontinuous grooves adapted to communicate with the feeder ducts and permit spreading of the grease over the surface of the plug shoulder which is uninterrupted except for the feeder ducts. The sealing means also includes a non-metallic ring or annulus 62 of substantially rectangular cross-section throughout supported on annulus 59 and engaging the surface 16 of the head portion 6. The metal annulus flange 58 retains the non-metallic ring 62 in position and prevents distortion or spreading of the latter under the high pressures exerted upon it. The operation of this valve is the same as that previously described, but it should be noted that the sealing means being provided with plane surfaces may move relative to each other and relative to either the plane shoulder or plane head surface, thus permitting a full freedom of movement of the plug with minimum friction.

Figure 9:
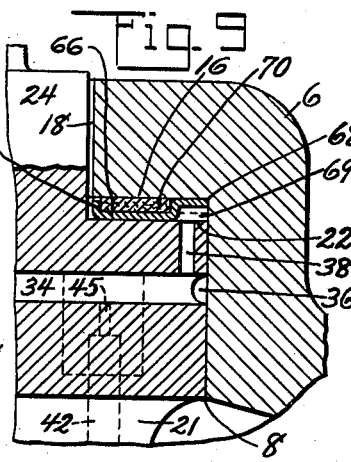
Fig. 9 is an enlarged sectional view showing a further modification of the valve.
Figure 11:
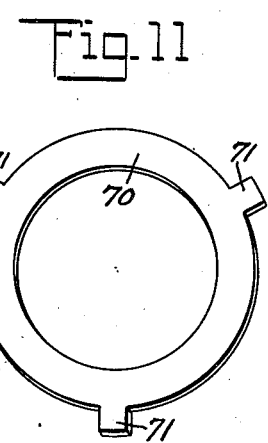

In the modification shown in Figs. 9, 10 and 11 the sealing means is slightly modified and the metallic annulus comprises a positioning and retaining flange 64 and a plane body portion 66, the edges of which are upwardly offset at intervals as at 68 to provide discontinuous grooves 69 formed in part by the valve body bore. The sealing means of Figs. 9, 10 and 11 also includes a non-metallic sealing ring or annulus 70, of such a width as to fit between the flange 64 and raised edge portions 68 of the metallic annulus and is provided with projections 71 which extend over the body portion of the metallic annulus between the adjacent raised portions. The operation of this valve is substantially the same as that previously described but the sealing grooves are provided adjacent the bore of the valve body and since the sealing means are substantially interlocked any relative movement must take place between the sealing means and the plane shoulder and/or plane surface 16 of the head portion 6.

Figure 13:
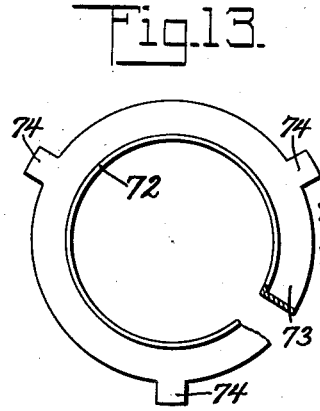
Figs. 13 and 14 are plan views of the spacing means shown in Fig. 12.
Figure 12:
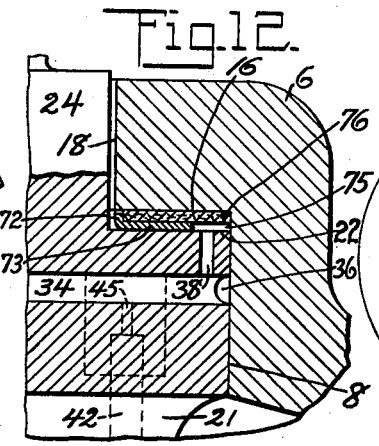
Fig. 12 is an enlarged sectional view showing a still further modification of the valve shown in Figs. 1 to 5.
Figure 14:
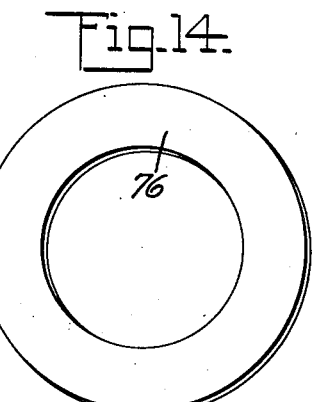

The form shown in Figs. 12, 13 and 14 is very similar to that shown in Figs. 9 to 11 inclusive, but in this case the metallic annulus is formed with retaining flange 72, plane body 73 with projections 74, thus providing discontinuous grooves 75 formed between the ring body and valve casing bore. This ring is thus substantially that shown in Fig. 10 with the raised portions 68 removed. The sealing ring 76 is substantially rectangular in cross section and fully fills the space between the metal annulus and the surface 16 of the head portion 6 and provides the top portion of the discontinuous grooves. This valve operates substantially the same as that shown in Figs. 9 to 11 inclusive with the exception that the sealing means may move relative to each other, thus providing three plane surfaces that may move relative to each other as in the modification shown in Fig. 6.

Figure 16:
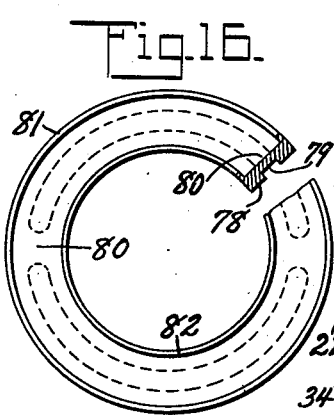
Figs. 16 and 17 are plan views of the spacing means used in Fig. 15.
Figure 15:
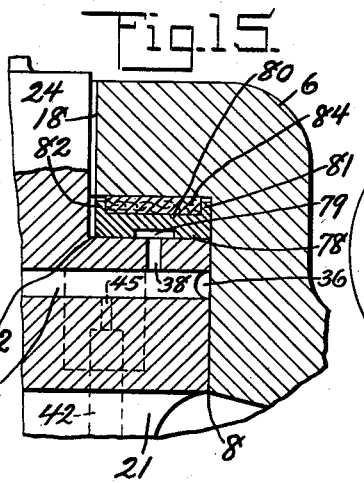
Fig. 15 is an enlarged sectional view of another modification of the valve shown in Figs. 1 to 5 inclusive.
Figure 17:
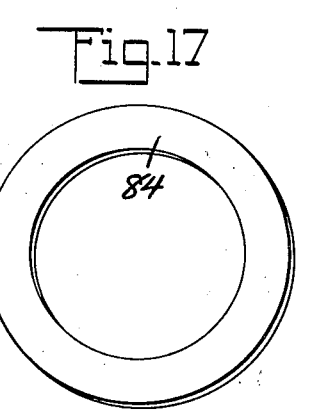

The valve shown in Figs. 15, 16 and 17 is provided with a metallic annulus having a plane lower surface 78 interrupted by discontinuous grooves 79, and a substantially plane upper surface 80 bounded by outer flange 81 and inner flange 82. In other words, the upper surface of the metallic annulus is provided with a circular recess 80 which receives the non-metallic sealing annulus 84 which is substantially rectangular in cross-section and of such a width as to closely fit between the flanges of the metallic annulus. The operation of this valve is very similar to those previously described and due to the plane sealing ring and metallic ring three surfaces are provided which may move relative to each other as in the modification shown by Figs. 6 and 12.

The modification shown in Figs. 18, 19 and 20 provides a slightly more resilient seal than those previously described since the metallic annulus is formed with a flat body 86, the inner portion of which is deflected upwardly as at 87 forming a segment of a cone spaced from the shoulder of the plug. The flat or plane body bears directly upon the plane plug shoulder and is provided with projections 88 which will in the assembled position provide discontinuous grooves 89 for the distribution of lubricant. The non-metallic sealing ring or annulus 90 is so shaped as to conform to the upwardly deflected portion of the metallic annulus, while a groove 92 is provided which communicates with the groove 89 for the admission of lubricant. In this form it is obvious that three surfaces are provided which may move relative to each other, while the lubricant may escape from the system when the system is completely filled because of movement of the plug axially or by reflection of the inclined portion or cone segment 87 of the metallic annulus.

The valve shown in Figs. 21, 22 and 23 is identical with that shown in Figs. 1 to 5 inclusive insofar as the sealing means at the head portion is concerned, but the base of the plug and its means of support is modified. In this valve the bottom sealing groove 40 is connected by openings 94 to the space below the plug and these openings are adapted to feed lubricant to grooves 96 of a supporting unit 97 substantially identical with that previously described as being used at the head portion of the valve shown in Fig. 1. This supporting unit surrounds a central raised portion 98 of cap 12 and is of such a thickness as to support the plug in slightly spaced relation to the cap projection. The upper sealing unit is identical with that shown in Fig. 1 and the valves will operate the same since the supporting and sealing means are sufficiently resilient as to permit a slight shift of the plug allowing excess grease to be vented between the metallic annulus and the plug shoulder at the head portion of the valve. The supporting ring provides a resilient support for the valve plug adjacent its periphery thus tending to make a more stable valve than the centrally supported valve plug of Fig. 1.

It is thus seen that a lubricated valve is provided wherein the head and plug are provided with plane surfaces spaced apart sufficiently to receive a slightly resilient sealing element and that this element, in combination with the slight axial shift of the plug, will permit the escape of excess grease from the valve, thus preventing excessive pressures and indicating the fully lubricated condition of the valve. It is obvious that for varying operating conditions it may be necessary to vary the area upon which the lubricant may act to cause axial shifting of the valve plug and that such variations may be readily accomplished merely by changing the sealing means and in some cases merely the metallic annulus. It is also obvious that the provision of the slightly resilient sealing means or wear member eliminates a major portion of the high machining and replacement costs. Still further, it can be seen that the valve of the present invention will be free of head leaks of line pressure by reason of the interposition of a composite element between the head portion of the valve and the valve plug.

While the valve and the various types of sealing or groove forming means have been shown in more or less detail, it is obvious that other modifications and arrangements of parts will suggest themselves to one skilled in the art, but such modifications and rearrangements are contemplated as will fall within the scope of the following claims:

What is claimed is:

1. In a lubricated valve, a valve body provided with a head portion, a plug in said body having a plane shoulder at its upper end portion, sealing means interposed between said shoulder and head portion and provided with a lubricant receiving recess therein cooperating with the shoulder to form a lubricant seal, and means cooperating with the plug in such a manner as to normally retain the shoulder, sealing means and head portion in engagement.

2. In a lubricated valve, a valve body having a head portion, a plug in said body having a plane shoulder at its upper end portion, sealing means interposed between said shoulder and head portion and provided with a lubricant receiving recess therein cooperating with the shoulder to form a lubricant seal, a base plate at the lower end portion of the valve body, and yieldable means interposed between the base plate and the lower end portion of the plug and normally acting against the plug to retain the shoulder, sealing means and head portion in engagement said yieldable means being provided with a lubricant receiving recess cooperating with the lower end portion of the plug to form a lubricant seal.

3. In a lubricated valve, a valve body having a head portion, a plug in said body having a plane shoulder at its upper end portion, sealing means interposed between said shoulder and head portion and provided with a lubricant receiving recess therein cooperating with the shoulder to form a lubricant seal, a base plate at the lower end portion of the valve body, and annular yieldable means interposed between the base plate and the lower end portion of the plug adjacent the periphery of the latter and acting against the plug to normally retain the shoulder, sealing means and head portion in engagement, said yieldable means being formed with a lubricant receiving recess cooperating with the lower end portion of the plug to form a lubricant seal.

ROBERT CLADE.